United States Patent
Tsirkin

(10) Patent No.: US 10,496,425 B2
(45) Date of Patent: Dec. 3, 2019

(54) SYSTEMS AND METHODS FOR PROVIDING PROCESSOR STATE PROTECTIONS IN A VIRTUALIZED ENVIRONMENT

(71) Applicant: Red Hat, Inc., Raleigh, NC (US)

(72) Inventor: Michael Tsirkin, Westford, MA (US)

(73) Assignee: RED HAT, INC., Raleigh, NC (US)

(*) Notice: Subject to any disclaimer, the term of this patent is extended or adjusted under 35 U.S.C. 154(b) by 199 days.

(21) Appl. No.: 15/438,437

(22) Filed: Feb. 21, 2017

(65) Prior Publication Data

US 2018/0239909 A1 Aug. 23, 2018

(51) Int. Cl.
| | |
|---|---|
| *G06F 9/455* | (2018.01) |
| *G06F 21/60* | (2013.01) |
| *G06F 21/53* | (2013.01) |
| *G06F 21/62* | (2013.01) |
| *G06F 21/75* | (2013.01) |
| G06F 9/46 | (2006.01) |
| G06F 21/57 | (2013.01) |
| G06F 21/78 | (2013.01) |

(52) U.S. Cl.
CPC .......... *G06F 9/45558* (2013.01); *G06F 21/53* (2013.01); *G06F 21/602* (2013.01); *G06F 21/6209* (2013.01); *G06F 21/75* (2013.01); G06F 9/461 (2013.01); G06F 21/57 (2013.01); G06F 21/78 (2013.01); G06F 2009/45587 (2013.01)

(58) Field of Classification Search
None
See application file for complete search history.

(56) References Cited

U.S. PATENT DOCUMENTS

| | | | |
|---|---|---|---|
| 8,555,377 B2 | 10/2013 | Pate | |
| 8,990,582 B2 | 3/2015 | Maino et al. | |
| 10,152,602 B2* | 12/2018 | Kaplan | G06F 12/1408 |
| 10,243,739 B1* | 3/2019 | Brandwine | G06F 9/4401 |

(Continued)

OTHER PUBLICATIONS

Cheng et al.; SuperCAII: A Secure Interface for Isolated Execution Environment to Dynamically use External Services; 2015; Retrieved from the Internet <URL: http://www.contrib.andrew.cmu.edu/~miaoy1/papers.html>; pp. 1-19, as printed. (Year: 2015).*

(Continued)

*Primary Examiner* — Saleh Najjar
*Assistant Examiner* — Michael W Chao
(74) *Attorney, Agent, or Firm* — Haynes and Boone LLP

(57) ABSTRACT

Methods, systems, and computer program products are included for providing protections to a processor state of a virtual machine. An example method includes providing, to a processor, instructions corresponding to a virtual machine. The processor is transitioned from executing the instructions corresponding to the virtual machine. As part of the transitioning, data stored in the processor's registers is encrypted and stored in memory. The hypervisor performs one or more operations, which may include modifying data in one or more of the processor's registers. After the hypervisor performs the one or more operations, the processor resumes processing of instructions corresponding to the virtual machine. As part of the resuming of processing, the encrypted processor state that was stored in memory is decrypted and loaded into the processor.

17 Claims, 4 Drawing Sheets

(56) References Cited

U.S. PATENT DOCUMENTS

| | | | |
|---|---|---|---|
| 10,303,879 B1* | 5/2019 | Potlapally | G06F 21/57 |
| 10,303,899 B2* | 5/2019 | Durham | G06F 8/63 |
| 2008/0216175 A1* | 9/2008 | Pike | G06F 21/52 726/22 |
| 2014/0006877 A1* | 1/2014 | Zhu | G06F 11/3466 714/45 |
| 2014/0053272 A1* | 2/2014 | Lukacs | G06F 21/53 726/24 |
| 2016/0132349 A1 | 5/2016 | Bacher et al. | |
| 2016/0378522 A1* | 12/2016 | Kaplan | G06F 12/1408 718/1 |
| 2017/0220369 A1* | 8/2017 | Kaplan | G06F 9/45558 |
| 2017/0286673 A1* | 10/2017 | Lukacs | G06F 21/554 |
| 2018/0165224 A1* | 6/2018 | Brown | G06F 21/57 |
| 2018/0247082 A1* | 8/2018 | Durham | G06F 9/45533 |
| 2018/0357093 A1* | 12/2018 | Cong | G06F 21/602 |
| 2018/0373895 A9* | 12/2018 | Durham | G06F 8/63 |
| 2019/0108051 A1* | 4/2019 | Wang | G06F 9/45558 |
| 2019/0155728 A1* | 5/2019 | Ferguson | H04L 63/0428 |

OTHER PUBLICATIONS

No stated author; AMD64 Architecture Programmer's Manual vol. 2: System Programming; Dec. 2016; Retrieved from the Internet <URL: http://kib.kiev.ua/x86docs/AMD64/24593_APM_v2-r3.27.pdf>; pp. 1-228 as printed. (Year: 2016).*

No stated author; Intel 64 and IA-32 Architectures Software Developer's Manual vol. 3C; Sep. 2016; Retrieved from the Internet <URL: https://www.intel.com/content/dam/www/public/us/en/documents/manuals/64-ia-32-architectures-software-developer-vol-3c-part-3-manual.pdf>; pp. 1-110, as printed. (Year: 2016).*

Xia, Yubin, et al., Architecture Support for Guest-Transparent VM Protection from Untrusted Hypervisor and Physical Attacks, Institute of Parallel and Distributed Systems, Shanghai Jiao tong University, 12 pgs.

* cited by examiner

SYSTEMS AND METHODS FOR PROVIDING PROCESSOR STATE PROTECTIONS IN A VIRTUALIZED ENVIRONMENT

FIELD OF DISCLOSURE

The present disclosure generally relates to digital data processing and virtualization, and more particularly relates to techniques for securing a virtual environment.

BACKGROUND

A virtual machine is software that is executed on hardware to create a virtualization of a physical computer system. Virtual machines function as self-contained platforms that run their own operating systems and software applications. A host machine concurrently runs one or more virtual machines using software that is referred to as a hypervisor. The hypervisor allocates portions of the host machine's resources to the virtual machines. These resources include, for example, the host machine's underlying physical processors and memory devices.

Guest applications, including guest operating systems, are executed on the allocated resources of each virtual machine. Local or remote clients access these guest applications to perform computing tasks. In some instances, virtual machines and guest applications are implemented to provide cloud computing environments.

SUMMARY

A system of one or more computers performs particular operations or actions by virtue of having software, firmware, hardware, or a combination thereof installed on the system that in operation causes or cause the system to perform the actions. One or more computer programs perform particular operations or actions by virtue of including instructions that, when executed by data processing apparatus, cause the apparatus to perform the actions. One general aspect includes a method including: providing instructions corresponding to a guest of a virtual machine to a virtual central processing unit (CPU). The method also includes encrypting a CPU state, where the CPU state includes data stored in one or more registers of the virtual CPU. The method also includes storing the encrypted CPU state in a non-transitory computer-readable medium. The method also includes transitioning execution from the virtual machine to a hypervisor, where the transitioning includes providing the CPU state from the virtual CPU to the hypervisor, and where the CPU state is provided to the hypervisor in an unencrypted format. The method also includes transitioning execution from the hypervisor to the virtual machine, where the transitioning includes decrypting the encrypted CPU state and loading the decrypted CPU state into the virtual CPU. Other examples of this aspect include corresponding computer systems, apparatus, and computer programs recorded on one or more computer storage devices, each perform the actions of the methods.

One general aspect includes a non-transitory machine-readable medium having stored thereon machine-readable instructions executable to cause at least one machine to perform operations including: providing, to a processor, instructions corresponding to a virtual machine. The non-transitory machine-readable medium also includes instructions for encrypting a processor state, the processor state including data stored in one or more registers of the processor. The non-transitory machine-readable medium also includes instructions for transitioning execution from the virtual machine to a hypervisor, where the transitioning includes providing the processor state to the hypervisor in an unencrypted format; and transitioning execution from the hypervisor to the virtual machine, where the transitioning includes decrypting the encrypted processor state and loading the decrypted processor state into the one or more registers of the processor. Other examples of this aspect include corresponding computer systems, apparatus, and computer programs recorded on one or more computer storage devices, each perform the actions of the methods.

One general aspect includes a system including: one or more processors coupled to a non-transitory memory. The system also includes a processor state that is stored in the non-transitory memory, where the processor state is stored in an encrypted format, and where the processor state stores data of one or more registers of a virtual processor; a hypervisor that accesses the data that is stored in the one or more registers of the virtual processor, where the data is stored in an unencrypted format, and where the accessing of the data is performed corresponding to a transition from a virtual machine to the hypervisor; and the virtual processor, where the virtual processor decrypts the processor state and loads the data from the decrypted processor state into the one or more registers of the virtual processor, and where the decrypting of the processor state is performed corresponding to a transition from the hypervisor to the virtual machine. Other examples of this aspect include corresponding computer systems, apparatus, and computer programs recorded on one or more computer storage devices, each perform the actions of the methods.

Figure 1:
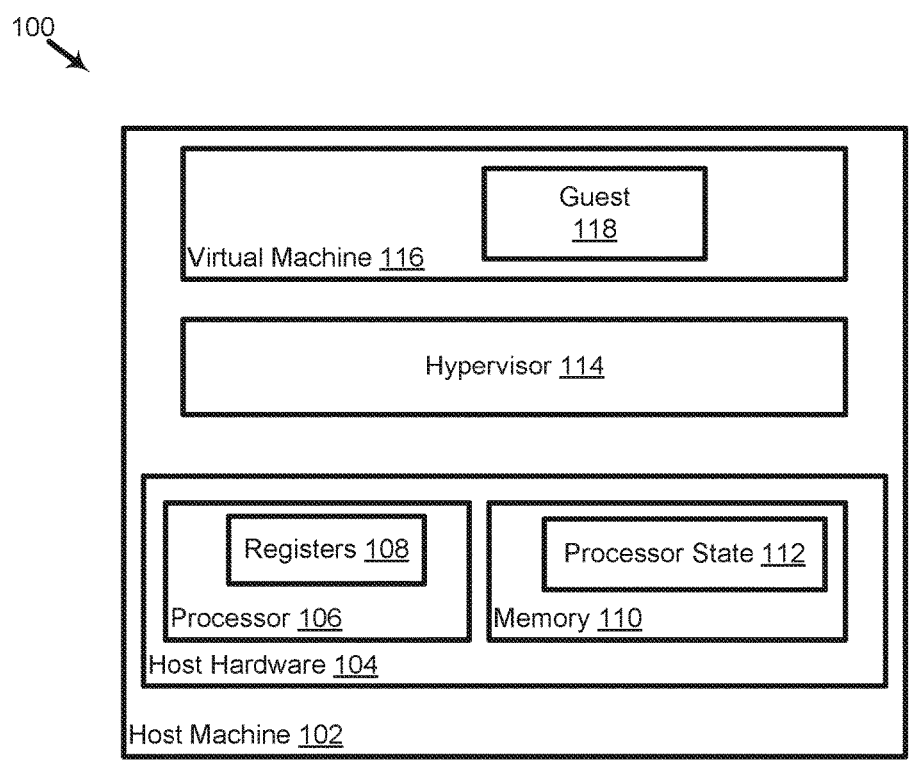
FIG. 1 is an organizational diagram illustrating a system that is structured to provide a virtualized environment that supports processor state encryption, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide cryptography techniques that provide privacy and security advantages in a virtualized environment. For example, a virtualized environment may include a hypervisor that provides multiple virtual machines that run guest applications. These virtualized machines may be provided to different organizations and/or other entities. It is beneficial to implement cryptography in the virtualized environment to protect the data associated with these entities.

Conventional cryptography techniques have problems with protecting virtual machines from the hypervisor that manages the virtual machines. In more detail, the hypervisor is provided with full access to the virtual machines (including full access to data stored in the virtual processors) to provide emulation features for these virtual machines. Accordingly, in conventional virtualization technology, the hypervisor is allowed to inspect and modify data corresponding to virtual machines. Thus, conventional virtual machines are not protected from malicious hypervisor actions. For example, the hypervisor may modify data stored in a virtual processor to cause a guest running on a virtual machine to bypass security checks or leak private data to the hypervisor.

The techniques described herein address the above problems using cryptography. In more detail, guest applications running on virtual machines provide instructions to a processor. The processor may encrypt data stored in the processor and in guest memory that is allocated to virtual machines. When a virtual machine (VM) exit occurs, the processor's data is stored in memory in an encrypted state. The encrypted processor state is also provided to the hypervisor in an unencrypted format, to allow the hypervisor to provide emulation functionality, such as handling page faults, performing I/O, and other virtual machine management functionality.

After the hypervisor has performed its operations using the unencrypted format of the processor state, the hypervisor causes the virtual machine to be re-entered to have processor resume execution of instructions corresponding to the virtual machine. As part of the resuming execution of the instructions, the encrypted processor state that was previously stored in memory is loaded back into the processor so that any modifications made to the processor data by the hypervisor are overwritten/ignored. Accordingly, the hypervisor is prevented from modifying the processor's data to cause the virtual machine to perform malicious actions.

The techniques described herein can be used to selectively allow the hypervisor to modify some portions of the processor state, based on the reason for the virtual machine exit and the particular actions performed by the hypervisor. The reason for the virtual machine exit is stored in memory so that when the virtual machine is re-entered, the reason is applied to the processor state to allow one or more of the hypervisor's modification to be retained. Accordingly, in some instances, the hypervisor is allowed at least partial access to modify the processor's data, for reasons such as handling page faults, performing input/output (I/O) access, and so forth.

These techniques described herein are beneficial and advantageous for providing virtual machine protection mechanisms that enhance the privacy and/or security of virtual machines. Of course, it is understood that these features and advantages are shared among the various examples herein and that no one feature or advantage is required for any particular example.

The techniques described herein are compatible with cryptography technologies provided by hardware, such as SOFTWARE GUARD EXTENSIONS (SGX) and SECURE ENCRYPTED VIRTUALIZATION (SEV). These are merely some examples of cryptography technologies, and it is understood that the techniques described herein are applicable to other technologies as well, whether implemented in software, hardware, or some combination thereof.

FIG. 1 is an organizational diagram illustrating a system that is structured to provide a virtualized environment that supports processor state encryption, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single source host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 is structured with host hardware 104. The host hardware 104 includes physical elements such as a processor 106 and a memory 110. In some examples more than one of each of these hardware elements may be included. For example, the host hardware 104 may include a plurality of processors coupled to various types of memory and host devices.

The processor 106 is structured to include one or more general-purpose processing devices such as a microprocessor, central processing unit (CPU), and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, and so forth. The processor 106 executes instructions for performing the operations, steps, and actions discussed herein.

The processor 106 is structured to include one or more registers 108. These registers may include an instruction pointer register that and a plurality of general purpose registers that store data relating to execution of instructions by the processor 106. For example, an instruction pointer register may store an address that indicates a location of a next instruction to be executed by the processor. The general purpose registers may be used to store addresses and/or operands that the processor reads from the registers to perform arithmetic or logical operations. The processor may also store results from arithmetic or logical operations in the registers. Data may be loaded into the registers from memory that is external to the processor 106. Similarly, data from the registers may be loaded into external memory.

The memory 110 is structured to include at least one computer-readable storage medium on which is stored one or more sets of instructions (e.g., software) embodying any one or more of the methodologies or functions described herein. The memory 110 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 106.

The memory 110 is structured to store a processor state 112. This processor state 112 may include data retrieved from one or more of the registers 108 of the processor 106. For example, the processor state 112 may include the contents of the instruction pointer and general purpose registers of the processor 106. Additionally, this processor state 112 may be loaded into the processor 106. The processor state 112 may be maintained in the memory 110 in an encrypted format, and the processor state 112 may also be decrypted and provided to the hypervisor 114 and/or applications running on the virtual machine 116.

The processor 106 and memory 110 may be communicatively coupled via one or more buses (e.g., a PCI bus) and/or integrated into a motherboard of the host machine 102. The host hardware 104 also may include other hardware elements, such as a video display unit (e.g., a liquid crystal display (LCD) monitor), alphanumeric input device (e.g., a keyboard), cursor control device (e.g., a mouse), signal generation device (e.g., a speaker), a network interface card, wireless adapter card, audio/sound card, graphics card, storage adapter, and/or other hardware device.

The host machine 102 is structured to provide the hypervisor 114, which may also be referred to as a virtual machine monitor and/or virtual machine manager. The hypervisor 114 is structured to include executable instructions that are stored in the memory 110 and executed by the processor 106 to provide virtual machine emulation capabilities. In some examples, the hypervisor 114 is structured to run on top of an operating system and/or kernel. In other examples, the hypervisor 114 is run directly on host hardware 104 without the use of a separate operating system or kernel.

The hypervisor 114 is structured to provide the virtual machine 116 by virtualizing at least a portion of the host hardware 104. The hypervisor 114 may provide the virtual machine 116 by performing a hardware emulation, full virtualization, para-virtualization, and/or operating system-level virtualization. The hypervisor 114 is structured to manage system resources, including management capabilities to provide applications that are running on the virtual machine 116 with access to portions of the host hardware 104, such as the processor 106 and the memory 110. For example, the hypervisor 114 may perform input/output (I/O) operations on behalf of applications running on the virtual machine 116 to allow the applications to communicate with physical elements of the host hardware 104.

In more detail, the hypervisor 114 may allocate a guest memory to each virtual machine, such as virtual machine 116. The guest memory comprises a portion of the memory 110. The hypervisor 114 may allocate the guest memory using page tables and/or other memory mapping features, which may be stored in the guest memory or in a portion of the memory 110 that is allocated to the hypervisor 114.

The hypervisor 114 may allocate one or more virtual processors to each virtual machine, such as virtual machine 116. Each virtual processor may be mapped to the processor 106 so that instructions that the guests pass to the virtual processors are executed by the processor 106. The hypervisor 114 and/or virtual machine 116 structure each virtual processor to include registers, which are mapped to registers 108 of the processor 106.

The virtual machine 116 is structured to include a guest 118. The guest 118 may be structured as one or more applications that are run on the virtualized hardware that the hypervisor 114 provides as a virtual machine 116. The guest 118 may include applications such as an operating system, kernel, one or more user applications, and any combination thereof. These applications may be stored in a guest memory that is allocated to the virtual machine 116 and executed by a virtualized processor that is mapped by the hypervisor 114 to processor 106.

A guest kernel of the virtual machine 116 may provide core computing functionality, such as allocating memory pages of the virtual machine's guest memory to processes and/or threads, providing input and/or output (I/O) access to and from virtual devices, managing a file system, handling interrupts, scheduling and running processes to execute instructions of computing tasks by a virtual processor, providing an interface between devices and software applications, and/or providing other computing features. A guest operating system of the virtual machine 116 may run on top of the kernel to provide additional interfaces and functionality on the virtual machine 116 beyond those offered by the kernel. The guest operating system may include, for example, RED HAT ENTERPRISE LINUX, FEDORA, WINDOWS, OS X, IOS, ANDROID, or any other operating system. In some examples, the virtual machine 116 may be structured to include a plurality of kernels and/or operating systems.

The guest 118 is structured to include computer-readable instructions, which are stored in the memory 110 and that are provided to the processor 106 for execution. The instructions corresponding to the guest 118 are loaded into registers 108 of the processor 106. The data from these registers 108 is also loaded into memory 110 as a processor state 112 to provide capabilities for restoring the processor state after a transition between the hypervisor and virtual machine (which is described in more detail with respect to FIGS. 2-4). Similarly, the hypervisor 114 may load instructions into registers 108 of the processor 106 and access the data stored in the registers 108. The guest 118 and hypervisor 114 may load data into the registers 108 and access data in the registers 108 using processor specific instructions, which may vary for different hardware processor vendors.

While only one guest is shown, generally a virtual machine is capable of running many guests and typically would do so. Moreover, although only one virtual machine is illustrated as running on host machine 102, the hypervisor 114 may provide a plurality of virtual machines that are run in parallel on the host machine 102. These other virtual machines may similarly run guest applications and access portions of the host hardware 104 that are allocated to the virtual machines by the hypervisor 114.

Figure 2:
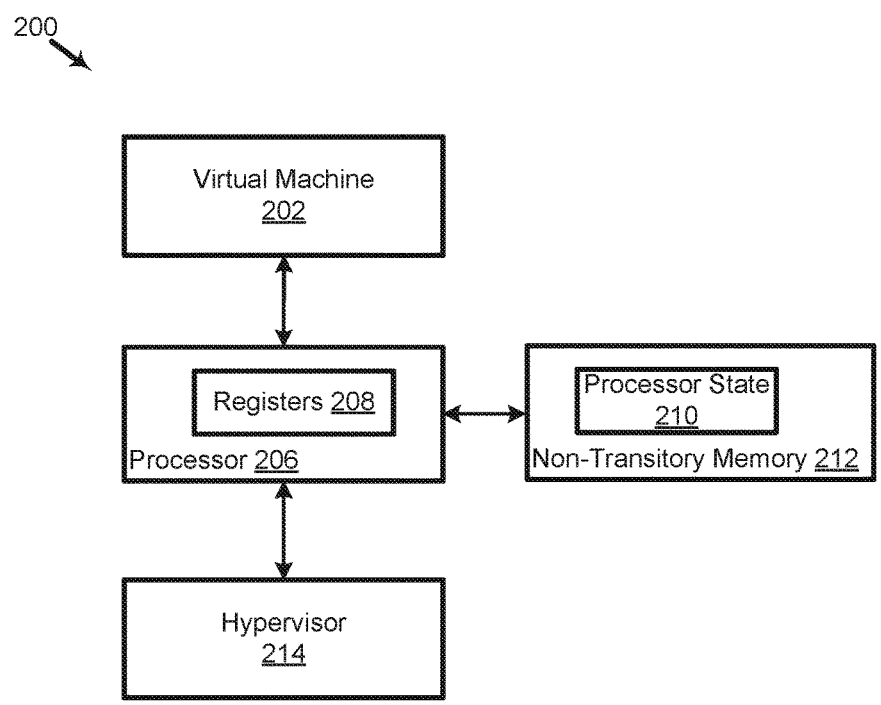
FIG. 2 is an organization diagram illustrating a system that performs techniques to protect a processor state corresponding to a virtual machine, in accordance with various examples of the present disclosure.

FIG. 2 is an organization diagram illustrating a system 200 that performs techniques to protect a processor state corresponding to a virtual machine, in accordance with various examples of the present disclosure. In some examples, the techniques are performed by executing computer-readable instructions that are stored in a non-transitory memory using one or more processors. The non-transitory memory and processors may be provided by, for example, the host hardware described with respect to FIG. 1.

The system 200 includes a virtual machine 202. In the present example, the virtual machine 202 runs one or more guest applications, which include instructions that are stored in a memory. The guest applications run on the virtualized hardware that is presented by the virtual machine 202. This virtualized hardware that is presented by the virtual machine 202 may include all or a portion of host hardware, which may include one or more processors and one or more memories.

The guest applications of the virtual machine 202 provide instructions to the processor 206 for execution. The processor 206 includes registers 208, which store guest application instructions and data corresponding to the instructions. For example, the registers 208 may be used by the processor 206 to store inputs and outputs corresponding to the instructions to perform arithmetic or logical operations. The processor 206 may be structured as a virtual processor that is mapped to one or more physical processors by the virtual machine 202 and/or the hypervisor 214.

The data stored in the registers 208 of the processor 206 is encrypted and stored in a non-transitory memory 212 as a processor state 210. This processor state 210 includes the data stored in the registers 208 at a particular point in time. In some examples, this processor state 210 is stored in a portion of memory that is allocated to the virtual machine 202. In other examples, the processor state 210 is stored in a portion of memory that is allocated to the hypervisor 214 and is inaccessible to the guest applications running on the virtual machine 202.

Execution is transitioned from the virtual machine 202 to the hypervisor 214. This may include loading one or more instructions of the hypervisor 214 into the processor 206 for execution. In some examples, the transitioning of execution from the virtual machine 202 to the hypervisor 214 is triggered by a virtual machine (VM) exit instruction, I/O access (such as virtual device I/O access), execution of a privileged instruction, a fault, a hypercall, or some combination thereof. When the execution is transitioned to the hypervisor 214 (including shortly before or after the transition), the hypervisor 214 loads the data stored by the registers 208 of the processor 206. In the present example, this data that is loaded from the registers 208 to the hypervisor is in an unencrypted format.

The hypervisor 214 may read the data from the registers 208 to perform one or more operations relating to management of the virtual machine 202, such as performing I/O with host hardware, handling page faults, handling execution of privileged instructions, and so forth. In some examples, as part of its virtual machine management tasks, the hypervisor 214 may modify the data stored in the registers 208.

The hypervisor 214 may also perform malicious modifications to the data stored by the registers 208 of the processor 206. For example, the hypervisor 214 may modify the processor's instruction pointer register to bypass a safety check of a guest application. Alternatively, the hypervisor 214 may modify an address stored in a register to cause the guest application's data to be leaked to the hypervisor 214.

Next, the processor 206 resumes processing of the instructions corresponding to the virtual machine 202. In some examples, the transitioning of execution from the hypervisor 214 to the virtual machine 202 is triggered by a virtual machine (VM) entry instruction that is provided to the processor 206 by the hypervisor 214. When the execution of the instructions of the virtual machine 202 is resumed, the stored processor state 210 is decrypted by the processor 206 and the data in the decrypted processor state 210 is loaded into the registers 208 of the processor 206.

This data from the decrypted processor state 210 overwrites data that is stored in the registers 208. As a result, this decrypted processor state data overwrites any potentially malicious modifications that the hypervisor 214 may have placed in the registers 208.

Figure 3:
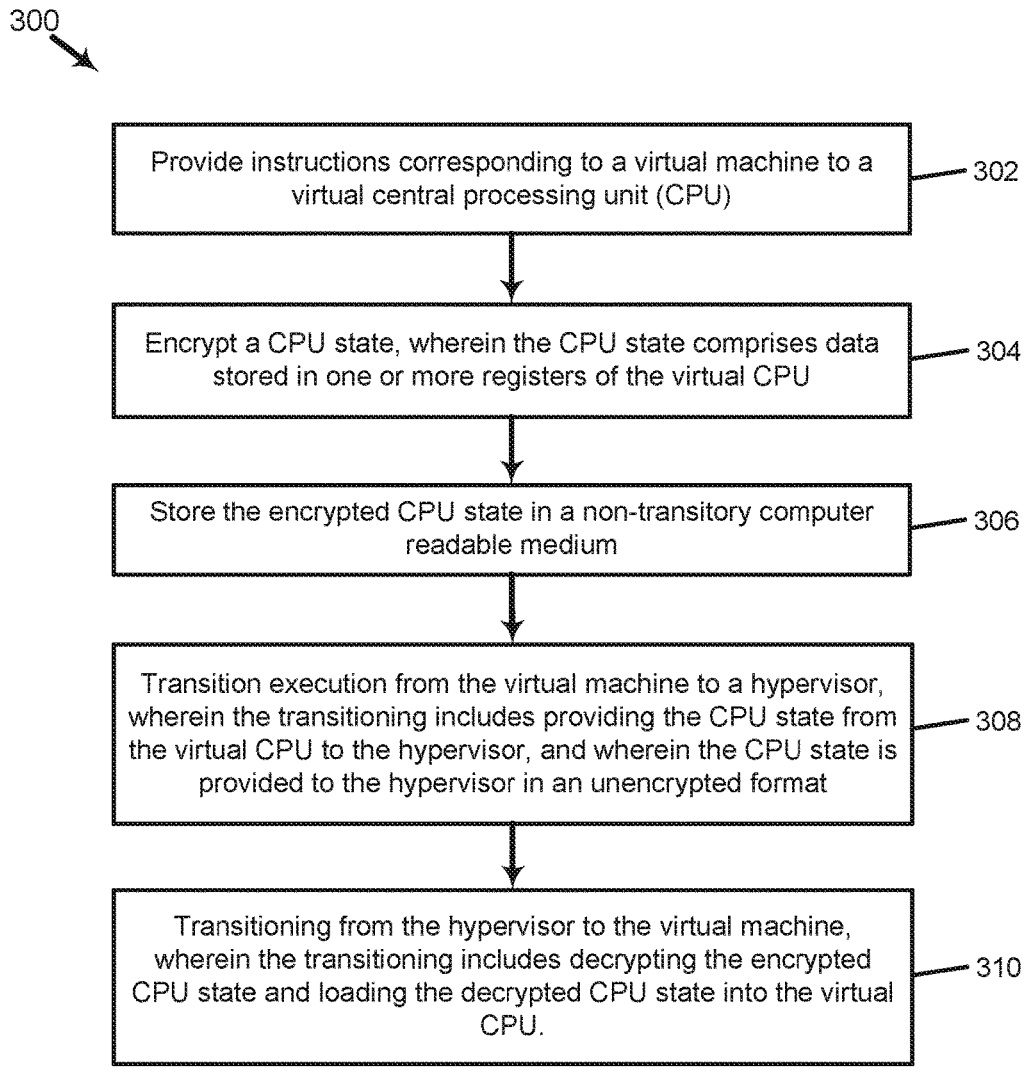
FIG. 3 is a flow diagram illustrating a method for providing processor state protection when transitioning processing from a virtual machine to a hypervisor and when transitioning processing from the hypervisor to the virtual machine, in accordance with various examples of the present disclosure.

FIG. 3 is a flow diagram illustrating a method 300 for providing processor state protection when transitioning processing from a virtual machine to a hypervisor and when transitioning processing from the hypervisor to the virtual machine, in accordance with various examples of the present disclosure. In some examples, the method is performed by the system components described with respect to FIG. 1.

At action 302, a guest running on a virtual machine provides instructions to a virtual central processing unit (CPU) of the virtual machine. For example, the guest may provide the virtual CPU with an address corresponding to an instruction for the virtual CPU to execute. The guest may also provide the virtual CPU with data that the virtual CPU uses to perform arithmetic and logical operations. In some examples, the instructions are provided to the virtual CPU by a kernel of the virtual machine. In some examples, the virtual machine is assigned one or more virtual CPUs by the hypervisor during a boot/initialization process of the virtual machine. The one or more virtual CPUs may correspond to one or more physical CPUs that the hypervisor has mapped to the virtual CPUs.

At action 304, the instructions are received by the virtual CPU and the virtual CPU's registers are updated corresponding to the received instructions. For example, the virtual CPU may include an instruction pointer register that identifies an address of an instruction for the virtual CPU to execute. The virtual CPU may also include general purpose registers that store data that the virtual CPU accesses to perform arithmetic and logical operations.

In the present example, the CPU state at a particular point in time includes the data stored in the registers of the virtual CPU. The virtual CPU encrypts the CPU state. In some examples the encrypted CPU state includes the data in all of the virtual CPU's registers. In other examples, the encrypted CPU state includes the data in a subset of the virtual CPU's registers. The virtual CPU may perform the encryption using a private key that is assigned to the virtual machine. Various cryptography techniques may be used to perform the encryption. As merely one example, the cryptography technique used to encrypt the CPU state may include a Secure Hash Algorithm (SHA) technique.

In some examples, the encrypting of the CPU state is triggered by the virtual machine providing a hypercall instruction to the virtual CPU. In other examples, the encrypting of the CPU state is performed by another action that triggers a transition from the virtual machine to the hypervisor. Triggers for the transition may include a virtual machine (VM) exit instruction, I/O access, execution of a privileged instruction, a fault (a page fault, for example), a hypercall, or other action that causes the virtual CPU to stop processing virtual machine instructions, at least temporarily, to allow the hypervisor to perform one or more operations.

At action 306, the virtual CPU causes the encrypted CPU state to be stored in a non-transitory computer readable medium. In some examples, the virtual machine provides the virtual CPU with an address of a location in guest memory for the virtual CPU to store the encrypted CPU state. In other examples, the hypervisor provides the virtual CPU with an address of a location in hypervisor or host memory for the virtual CPU to store the encrypted CPU state.

At action 308, the virtual machine causes the virtual CPU's execution to be transitioned from the virtual machine to the hypervisor. As discussed above with respect to action 304, the transition may be caused by a VM exit, fault, virtual device (I/O) access, attempted execution of a privileged instruction, a hypercall, or other operation performed on the virtual machine that triggers the virtual CPU to stop executing instructions of the virtual machine, at least temporarily, to allow the hypervisor to perform one or more operations. As part of the transition, or shortly before or after the transition, the hypervisor loads the CPU state of the virtual CPU. In some examples, the hypervisor loads the CPU state of the virtual CPU by reading data from one or more of the virtual CPU's registers. In some examples, the hypervisor loads the CPU state by reading data from one or more registers of a physical CPU that is mapped to the virtual CPU.

The CPU state that is provided to the hypervisor is in an unencrypted I plain text format. Accordingly, unlike the encrypted CPU state that was stored in the memory, the hypervisor is able to read the data in the obtained CPU state. For example, the hypervisor may read the data from the instruction pointer register of the virtual CPU to determine an address of an instruction that the virtual CPU was executing. As another example, the hypervisor may read the data from the general purpose registers of the virtual CPU to determine operands for logical and arithmetic operations, counters, pointers to stack data, and/or other data relating to execution of the virtual machine's guests by the virtual CPU.

In some examples, the hypervisor modifies the data stored in the registers of the virtual CPU. Some examples relating to hypervisor modifications are provided in more detail with respect to FIG. 4. In other examples, the hypervisor may place malicious data into the registers, such as by modifying the address stored in the virtual CPUs instruction pointer register to point to a malicious/harmful instruction or skip a virtual machine check.

At action 310, the hypervisor causes the virtual CPU's execution to be transitioned back to the virtual machine from the hypervisor. In some examples, the transition of the virtual machine is caused by a VM entry instruction that is provided to the virtual CPU from the hypervisor, which triggers the virtual CPU to resume execution of instructions corresponding to the virtual machine. As part of the transition, or shortly before or after the transition, the virtual CPU reads the data from the encrypted CPU state that was stored in memory to decrypt the data and load the decrypted data back into the virtual CPU's registers. As a result of loading the decrypted data back into the virtual CPU's registers, hypervisor modifications to the data stored in the registers during action 308 are overwritten.

Figure 4:
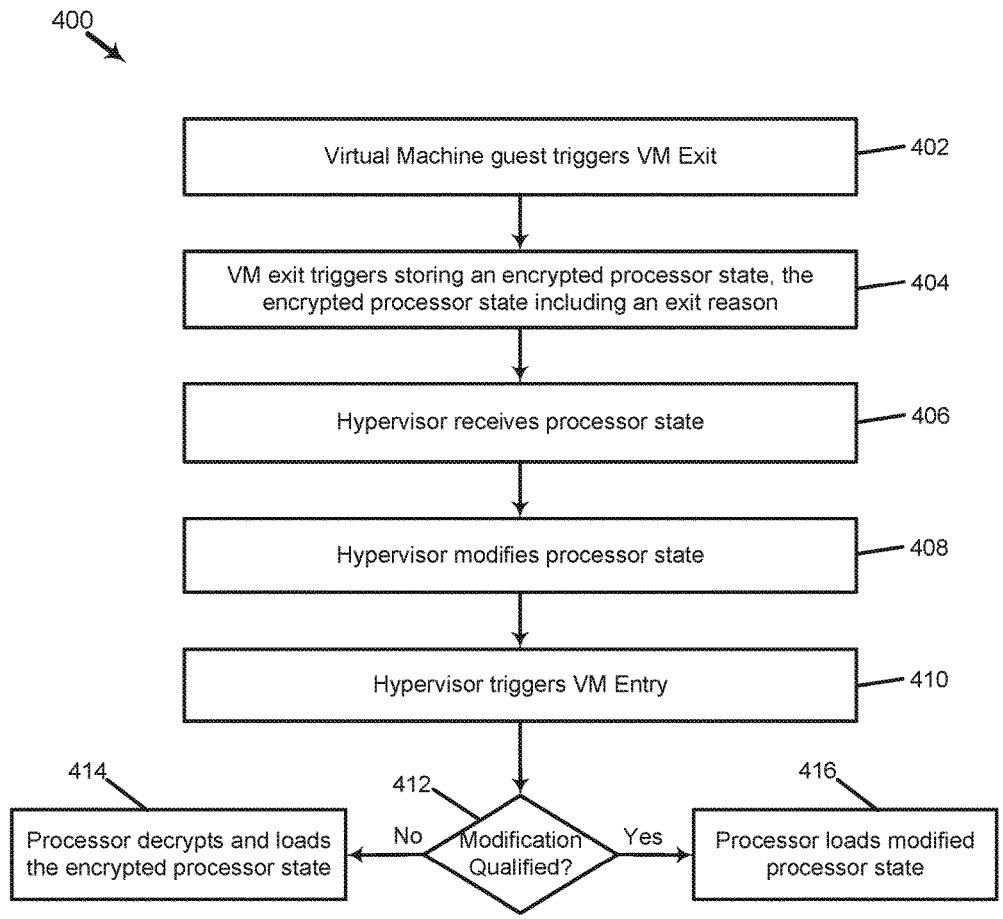
FIG. 4 is a flow diagram illustrating a method for accepting qualified processor state changes, in accordance with various examples of the present disclosure.

FIG. 4 is a flow diagram illustrating a method 400 for accepting qualified processor state changes, in accordance with various examples of the present disclosure.

At action 402, a virtual machine guest triggers a virtual machine (VM) exit. In some examples, the VM exit is triggered by an instruction that the guest provides to a processor. In other examples, the VM exit is triggered by the processor detecting an event, such as a page fault. In some examples, the processor includes a virtual processor that the hypervisor allocates to the virtual machine. In some examples, the VM exit corresponds to an instruction that is provided to the processor to transition the processor from a guest mode to a host mode.

At action 404, responsive to the VM exit, the processor encrypts its processor state and stores the encrypted CPU state in memory. In the present example, the encrypted processor state includes encrypted the data from the processor's register as well as an exit reason. For example, if the VM exit was caused by a page fault, the exit reason includes an indication of a page fault. In another example, if the VM exit was performed so that the hypervisor can handle I/O access, the exit reason includes an indication that the exit is related to I/O access. In yet another example, if the VM exit was performed because of an attempted execution of a privileged instruction, the exit reason includes an indication that the exit is related to execution of a privileged instruction. In yet another example, if the VM exit was caused by the guest providing a hypercall instruction to the processor, the exit reason includes an indication that the exit is related to a hypercall. These are merely examples, and other exit reasons may also be included in the encrypted CPU state.

At action 406, the hypervisor causes the processor to pass data from its registers to the hypervisor. Accordingly, the hypervisor is able to read the processor's state by reading the data stored in the processor's registers.

At action 408, the hypervisor performs one or more operations and modifies the processor state. For example, if the exit was caused by a page fault, the hypervisor may perform one or more operations to handle the page fault (such as providing the virtual machine access to a particular portion of memory). The hypervisor may then update the processor's instruction pointer register to point to a particular address. In another example, if the exit was caused by a I/O access, the hypervisor may perform one or more operations relating to the I/O access, and advance the processor's instruction pointer to a next instruction. These are merely some examples of operations that the hypervisor may perform, which would cause the hypervisor to modify the processor state, and other modifications to the processor state are envisioned. Accordingly, the hypervisor modifies the processor state by modifying data stored in particular registers of the processor.

At action 410, after performing the modifications to the processor state, the hypervisor triggers a VM entry so that the processor resumes executing instructions provided by virtual machine guests. In some examples, the VM entry corresponds to an instruction that is provided to the processor to transition the processor from a host mode to a guest mode.

At action 412, the processor determines whether the modification to the processor state is a qualified modification that the hypervisor is allowed to make. In more detail, the processor reads the exit reason from the encrypted processor state and determines whether the modified registers of the processor are qualified modifications for the particular exit reason. For example, the processor may access a table or other data structure that specifies which registers the hypervisor is allowed to modify for each exit reason.

As an example, the processor may access a default rule that modifications to the processor state are not allowed. The processor may access a data structure to determine qualified modification exceptions to this default rule, such as that the hypervisor is allowed to modify the processor's instruction pointer register if the exit reason related to a page fault or I/O access. Accordingly, if the processor identifies from the encrypted processor state that the exit reason corresponds to a page fault or I/O access, the processor may accept the hypervisor's modification to data stored in the processor's instruction pointer because these modifications are qualified modifications.

At action 414, if the processor determined that the modifications to the processor's state are not qualified, the processor decrypts the encrypted processor state and loads the data from the decrypted processor state into the registers. Accordingly, any non-qualified modifications that were made to the processor state by the hypervisor are overwritten, thus restoring the processor state to its condition at the time of the VM exit.

At action 416, if the processor determined that the modifications to the processor's state are qualified (e.g., the particular registers modified are allowed modifications for the particular exit reason) the processor does not overwrite the modifications with the data from the encrypted processor state. For example, the processor may decrypt the encrypted processor state and load the decrypted processor state data into the registers, except for the registers that include the qualified modifications. In another example, the processor may skip decrypting and loading the encrypted processor state into the registers so that the qualified modifications to the data in the processor's registers is not overwritten. In yet another example, the processor may decrypt the encrypted processor state, insert into the decrypted processor state the qualified modifications to the data in the registers, and then overwrite the data in the processor's registers with the decrypted processor state (including the qualified modifications). Accordingly, based on the reason for the exit from the virtual machine and specified qualifications, modifications from the hypervisor are allowed to persist in the processor's registers after the VM entry.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
    providing instructions corresponding to a guest of a virtual machine to a virtual central processing unit (CPU);
    encrypting a CPU state, wherein the CPU state comprises data stored in one or more registers of the virtual CPU;
    storing the encrypted CPU state in a non-transitory computer readable medium;
    transitioning execution from the virtual machine to a hypervisor, wherein the transitioning includes providing the CPU state from the virtual CPU to the hypervisor, and wherein the CPU state is provided to the hypervisor in an unencrypted format;
    modifying, by the hypervisor, the CPU state; and
    transitioning execution from the hypervisor to the virtual machine, wherein the transitioning includes
        decrypting the encrypted CPU state,
        determining, based on the transitioning execution to the hypervisor, that the modified CPU state complies with a qualification in a table, and
        responsive to the determining, including the modified CPU state in the virtual CPU after transitioning execution from the hypervisor to the virtual machine.

2. The method of claim 1, wherein the encrypted CPU state is stored in a portion of the non-transitory computer readable medium that is allocated to the virtual machine.

3. The method of claim 1, wherein the hypervisor modifies the CPU state, and wherein the loading of the decrypted CPU state into the virtual CPU overwrites the modified CPU state.

4. The method of claim 1 further comprising:
    modifying, by the hypervisor, the CPU state;
    determining that the hypervisor modified the CPU state; and
    responsive to the determining, performing at least one of operation selected from the group consisting of: aborting operation of the virtual machine; aborting operation of the hypervisor; and sending a notification.

5. The method of claim 1 further comprising:
    providing, in the encrypted CPU state, a reason for transitioning execution from the virtual machine to the hypervisor.

6. The method of claim 5 further comprising:
    wherein the reason corresponds to a page fault or input/output (I/O) access.

7. The method of claim 1, wherein the qualification comprises a data structure that indicates particular modifications that are allowed corresponding to the reason, and wherein the particular modifications that are allowed corresponding the reason include a modification to data stored in an instruction pointer register of the virtual CPU.

8. A non-transitory machine-readable medium having stored thereon machine-readable instructions executable to cause at least one machine to perform operations comprising:
    providing, to a processor, instructions corresponding to a virtual machine;
    encrypting a processor state, the processor state comprising data stored in one or more registers of the processor;
    transitioning execution from the virtual machine to a hypervisor, wherein the transitioning includes providing the processor state to the hypervisor in an unencrypted format;
    modifying, by the hypervisor, the processor state; and
    transitioning execution from the hypervisor to the virtual machine, wherein the transitioning includes
        decrypting the encrypted processor state
        determining, based on the transitioning execution to the hypervisor, that the modified state complies with a qualification in a table, and
        responsive to the determining, including the modified state in the one or more registers of the processor after transitioning execution from the hypervisor to the virtual machine.

9. The non-transitory machine-readable medium of claim 8, wherein the encrypted processor state comprises an encrypted copy of the data stored in the one or more registers of the processor at a point in time.

10. The non-transitory machine-readable medium of claim 8, wherein the hypervisor modifies the unencrypted format of the processor state provided to the hypervisor, and wherein the decrypted processor state that is loaded into the one or more registers of the processor does not include the modification.

11. The non-transitory machine-readable medium of claim 8, the operations further comprising:
   determining that hypervisor modified the processor state; and
   based on the determining, aborting operation of the virtual machine, aborting operation of the hypervisor, and/or sending a notification.

12. The non-transitory machine-readable medium of claim 8, wherein the reason corresponds to a page fault or input/output (I/O) access, and wherein the qualified modification is that the hypervisor modified data stored in an instruction pointer register of the processor.

13. A system comprising:
   one or more processors coupled to a non-transitory memory;
   a processor state that is stored in the non-transitory memory, wherein the processor state is stored in an encrypted format, and wherein the processor state stores data of one or more registers of a processor;
   a hypervisor that accesses the data that is stored in the one or more registers of the processor to create a modified processor state, wherein the data is stored in an unencrypted format, and wherein the accessing of the data is performed corresponding to a transition from a virtual machine to the hypervisor; and
   wherein the one or more processors decrypt the processor state, determines based on the transition to the hypervisor that the modified processor state complies with a qualification in a table, and responsive to the determination includes the modified processor state in the one or more registers of the processor, and
   wherein the decrypting of the processor state is performed corresponding to a transition from the hypervisor to the virtual machine.

14. The system of claim 13, the system to perform operations comprising:
   determining that hypervisor modified the data stored in the one or more registers of the processor; and
   based on the determining, aborting operation of the virtual machine, aborting operation of the hypervisor, and/or sending a notification.

15. The system of claim 13, the system to perform operations comprising:
   storing, in the processor state, a reason for the transition from the virtual machine to the hypervisor.

16. The system of claim 15, wherein the reason corresponds to input/output (I/O) access, and wherein the qualified modification is a modification of data stored in an instruction pointer register of the processor.

17. The system of claim 13, wherein the modifying includes advancing an instruction pointer register of the processor.

* * * * *